(12) United States Patent
Shi (10) Patent No.: US 11,722,028 B2
(45) Date of Patent: Aug. 8, 2023

(54) SYSTEM FOR HAIRPIN WINDINGS IN ELECTRIC MOTORS

(71) Applicant: DANA TM4 INC., Boucherville (CA)

(72) Inventor: Ruisheng Shi, Montreal (CA)

(73) Assignee: DANA TM4 INC., Boucherville (CA)

( * ) Notice: Subject to any disclaimer, the term of this patent is extended or adjusted under 35 U.S.C. 154(b) by 189 days.

(21) Appl. No.: 17/217,960

(22) Filed: Mar. 30, 2021

(65) Prior Publication Data
US 2022/0320934 A1 Oct. 6, 2022

(51) Int. Cl.
*H02K 3/28* (2006.01)
*H02K 3/14* (2006.01)

(52) U.S. Cl.
CPC ............. *H02K 3/28* (2013.01); *H02K 3/14* (2013.01)

(58) Field of Classification Search
CPC .. H02K 3/04; H02K 3/12; H02K 3/14; H02K 3/28
USPC ................................ 310/179, 195, 201–207
See application file for complete search history.

(56) References Cited

U.S. PATENT DOCUMENTS

| | | | |
|---|---|---|---|
| 6,894,417 B2 | 5/2005 | Cai et al. | |
| 7,034,428 B2 | 4/2006 | Cai et al. | |
| 9,520,753 B2 | 12/2016 | Rahman et al. | |
| 10,044,236 B2 | 8/2018 | Tamura | |
| 10,326,326 B2 | 6/2019 | Laldin et al. | |
| 2015/0280507 A1* | 10/2015 | Kayano | H02K 3/505 310/71 |
| 2016/0248291 A1* | 8/2016 | Tamura | H02K 3/12 |
| 2020/0395804 A1* | 12/2020 | Ahmed | H02K 3/14 |

* cited by examiner

*Primary Examiner* — Ahmed Elnakib
*Assistant Examiner* — Minki Chang
(74) *Attorney, Agent, or Firm* — McCoy Russell LLP (57) ABSTRACT

Systems for a voltage balanced multi-set hairpin windings for electric motors are provided. The systems comprise a stator assembly of an electric motor system, a plurality of radial slots positioned around an inner cylindrical surface, and a winding scheme for the stator assembly including alternating positioning of a hairpin wire having a seven slot span and another hairpin wire having a five slot span in four sub-circuits.

16 Claims, 6 Drawing Sheets

SYSTEM FOR HAIRPIN WINDINGS IN ELECTRIC MOTORS

TECHNICAL FIELD

The present disclosure relates to systems for voltage balanced multi-set hairpin windings for electric motors.

BACKGROUND

In automotive applications, an electric motor is used for multiple purposes including as a starter motor, an electric drive assist (propulsion boost) as well as pure electric drive, a generator providing electric power for onboard electric loads and charging the battery banks, and as a re-generator acting to convert the kinetic energy of the vehicle to electric power for charging the battery bank during braking/deceleration of the vehicle. In such automotive applications, it may be desirable to have high frequency electric motors in order to achieve high efficiency and cost-effective vehicle design.

A common issue with high frequencies in electric motors is loss of efficiency due to skin effect. The skin effect reduces the effective cross-sectional area through which current can flow in a conductive wire at high frequencies, increasing the resistance of a conductive wire above its DC resistance, and thus reducing the continuous power of the electric motor. In one example, in order to counteract the skin effect in high frequency operation of an electric motor, the number of conducting copper wires per slot in the stator may be increased in the form of rectangular conducting wires. However, in introducing a greater number of rectangular conducting wires per slot, the higher output phase voltage is generated by varying flux going through for the greater number of sub-circuits composed of the conducting wires. If sub-circuits of the conducting wires are in series, it may be required to increase the input voltage in order to maintain a speed of the electric motor. Additionally, if the input voltage applied to the different phases of the electric motor is imbalanced, greater inefficiencies may be introduced through current imbalances and heating. Hence, a wiring scheme which can maintain a greater number of conductors per slot while maintaining balanced voltage of the phases of the electric motor may be desired.

SUMMARY

To overcome at least some of the aforementioned challenges a system for a three-phase electric motor is provided. The system for a stator assembly of an electric motor, may include: a plurality of radial slots positioned around an inner cylindrical surface, and a winding scheme for the stator assembly including alternating positioning of a hairpin wire having a seven slot span and another hairpin wire having a five slot span in four sub-circuits. In introducing a wiring scheme including alternating 5-7-5-7 or 7-5-7-5 slot spans for hairpin windings within each sub-circuit, the electric motor may be able to maintain four parallel sub-circuits under balanced output voltages. Maintaining balanced voltages in four sub-circuits allows for eight or higher (10, 12 and so on) conducting wires per slot, reducing skin effect losses, and allowing for increased speed and efficiency during high frequency operation of an electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2A is drawn approximately to scale. However, other relative dimensions of the components may be used, in other embodiments.

DETAILED DESCRIPTION

The following description relates to a system for a winding scheme with four voltage balanced sub-circuits of conductive hairpin wires within a stator of a three-phase electric motor. The system includes hairpin wires alternating with a 5 slot span and a 7 slot span in four sub-circuits. The four sub-circuits may be wired into three phases, such that the input voltage for each phase is equal. The four sub-circuits may consist of an inner layer and an outer layer, summing to eight conducting wires per slot. Additionally, in order to maintain a 5-7-5-7 slot span hairpin winding scheme and to maintain balanced voltages for each phase, each leg of a hairpin may be bent outwards over a 3 slot span, allowing for an identical leg bending scheme for all hairpin wires within the wiring scheme.

In this way, in having a wiring scheme comprised entirely of alternating 5 slot span and 7 slot span hairpin wires, with each hairpin wires having an identical 3 slot span leg bending, complexity of the wiring scheme may be reduced and efficient operation of the electric motor under high frequency operation may be maintained. The inclusion of eight wires per slot may reduce losses from the skin effect over previous wiring schemes, allowing for high efficiency operation of the electric motor at high frequencies. Additionally, the wiring configuration allows for balanced input voltages for each phase, which may reduce current losses and excessive heating of the electric motor. Due to the simplicity of the wiring scheme, manufacturing may also be simplified. As an example, welding of the legs of the hairpin wires may be simplified due to the identical 3 slot span leg bending configuration for each hairpin wire. As another example, in having only two types of hairpin wires, hairpin wire manufacturing costs may be reduced.

Figure 1:
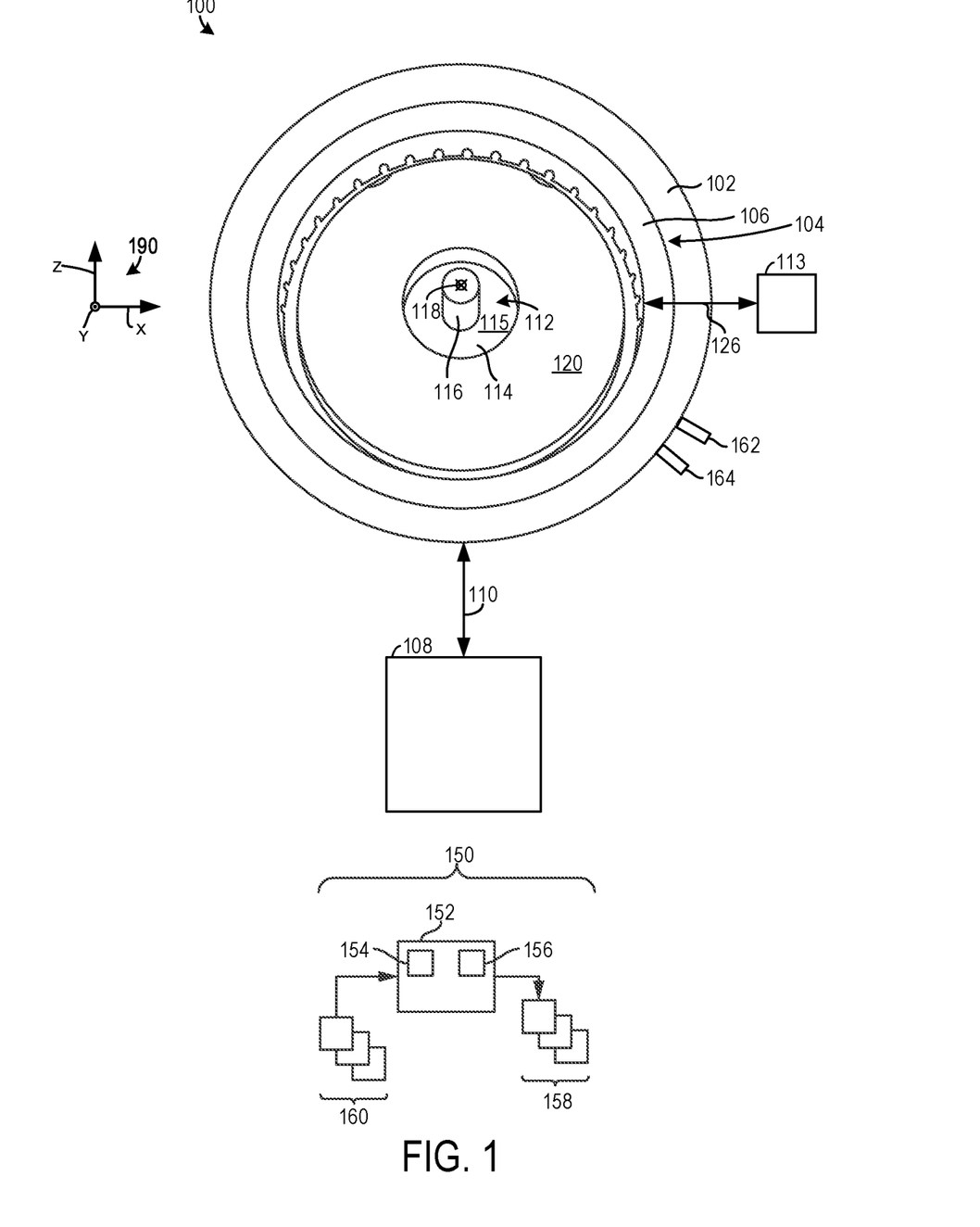
FIG. 1 shows an end view of an electric motor.
Figure 2A:
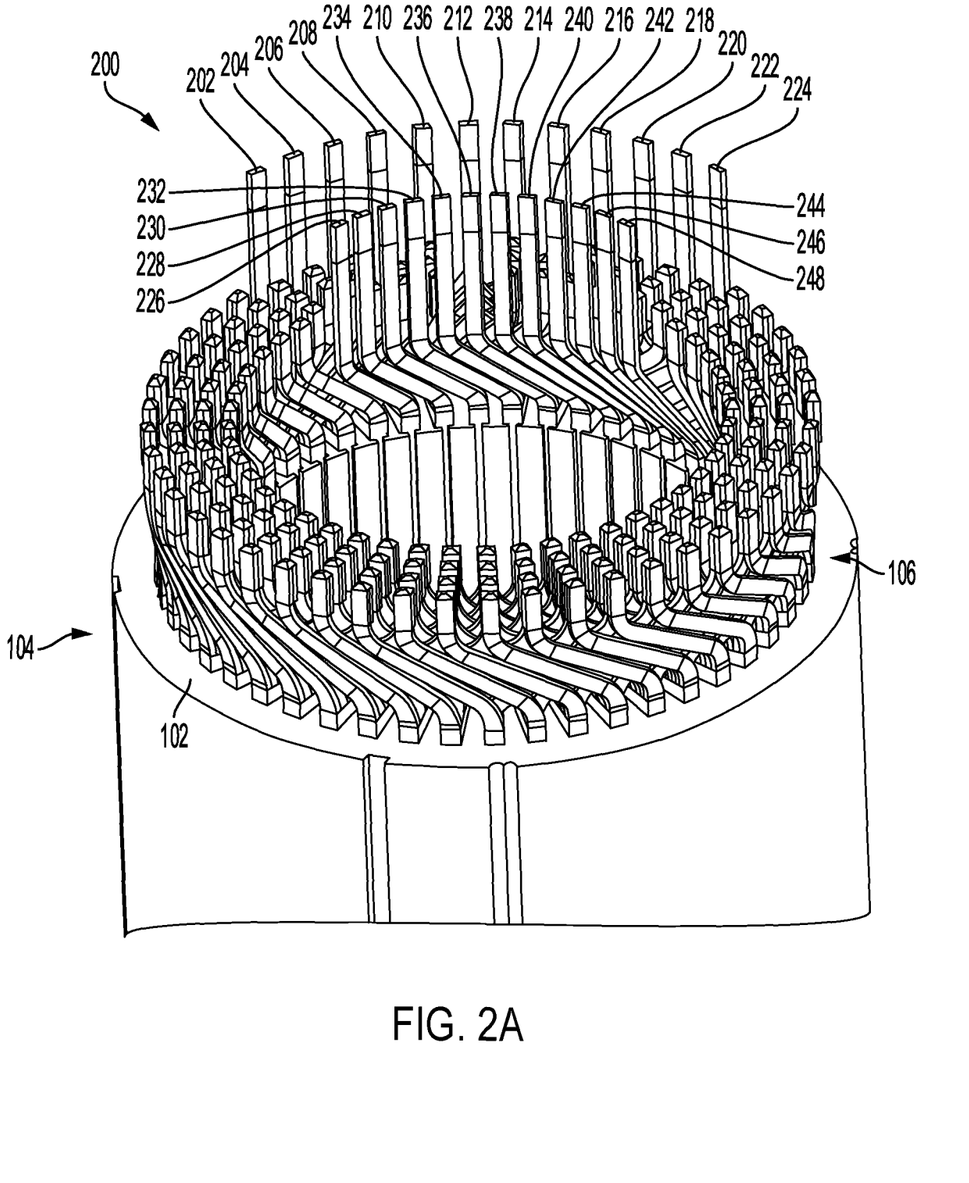
FIG. 2A shows a perspective view of a stator of the electric motor of FIG. 1, as viewed from the connection end of the stator.
Figure 2B:
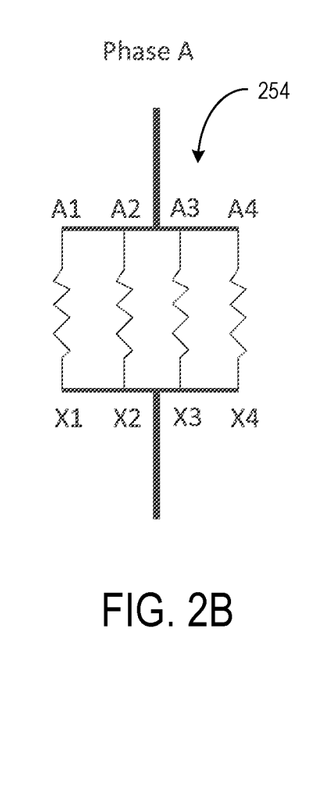
FIGS. 2B-2D show schematic example wirings for the 3 phases of the electric motor.
Figure 2C:
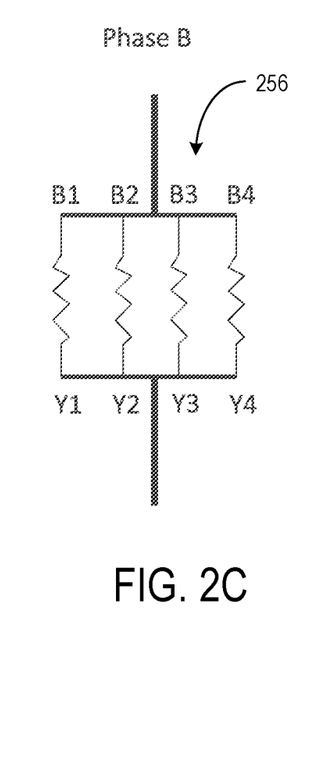
Figure 2D:
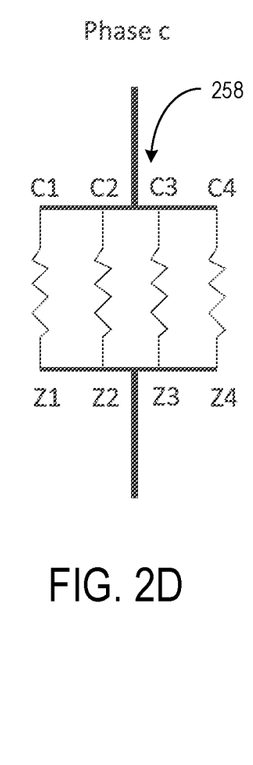
Figure 3A:
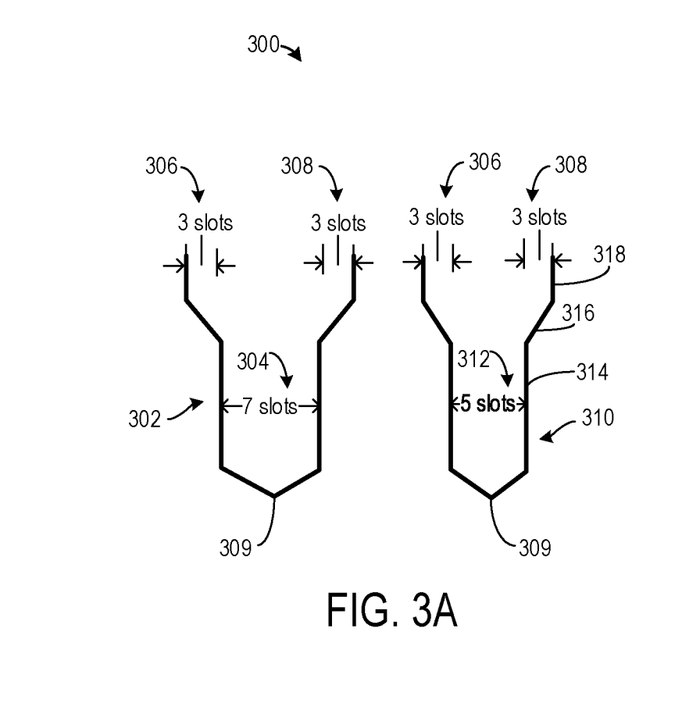
FIG. 3A shows schematic example of 5 slot span and 7 slot span hairpin wires.
Figure 3B:
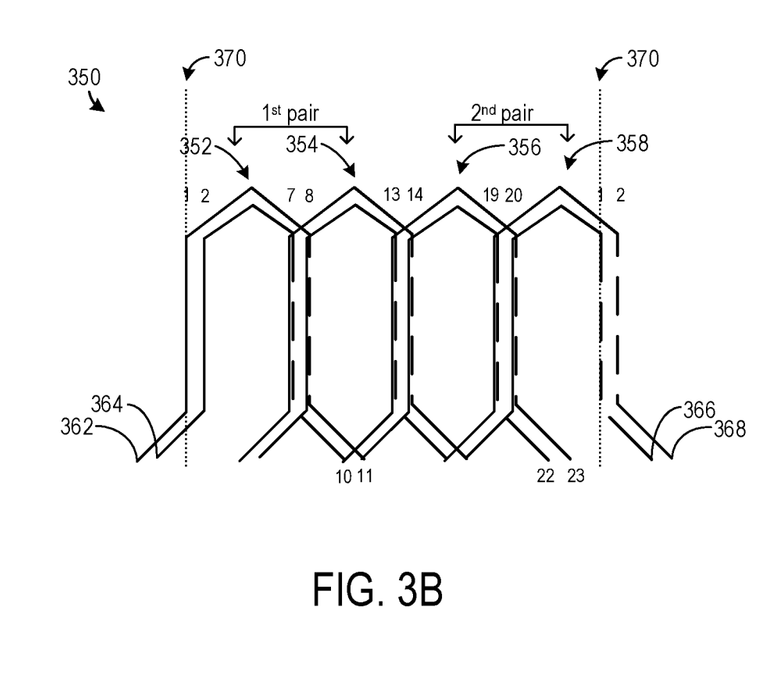
FIG. 3B shows a schematic example of a 4 voltage-balanced winding scheme for a three-phase electric motor with two pair poles.
Figure 4:
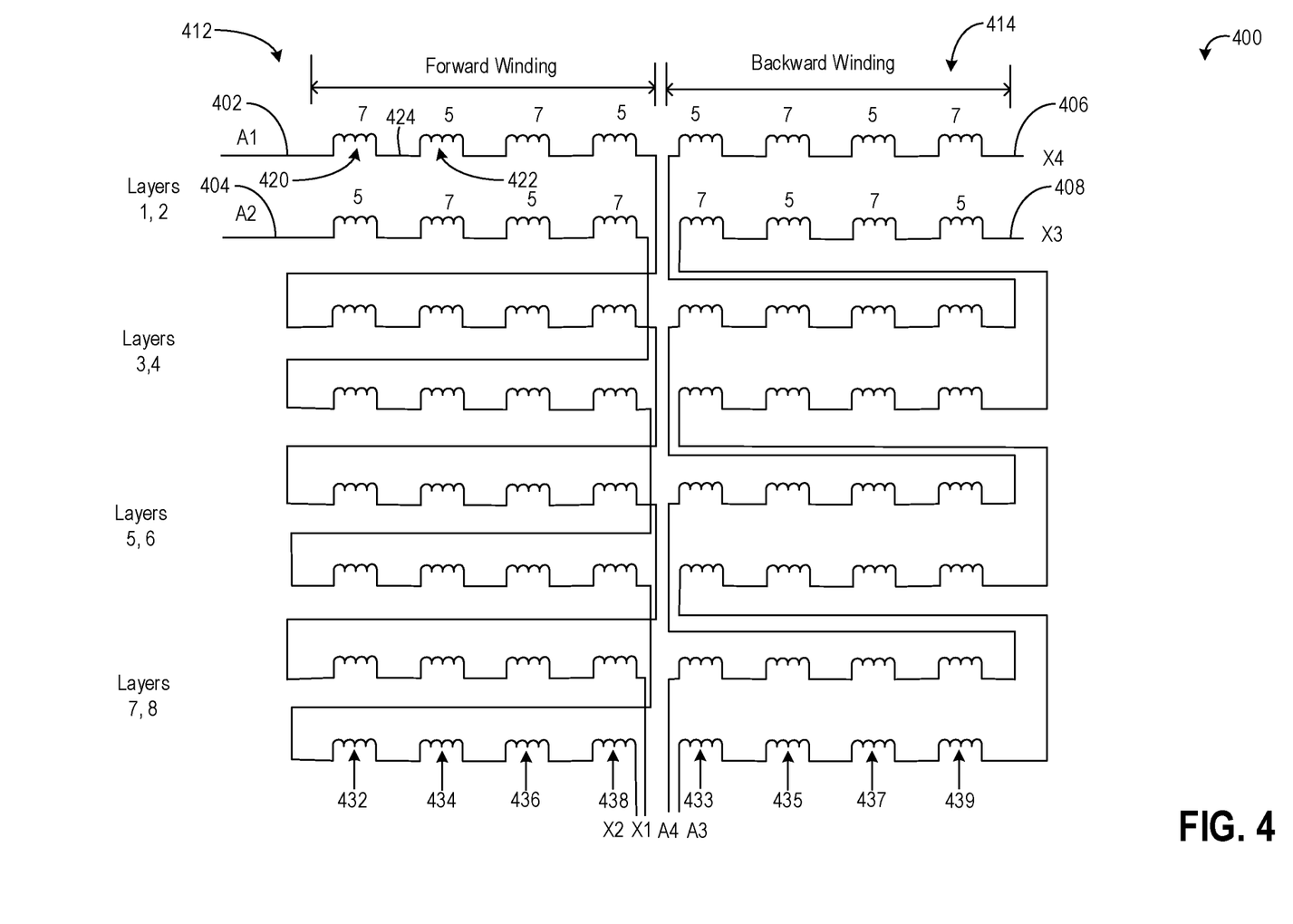
FIG. 4 shows a schematic example of a winding scheme composed entirely of 7 pitch and 5 pitch hairpin wires, for a single phase of the electric motor.

An example embodiment of the electric motor including a stator and a rotor is shown in FIG. 1. A perspective view of the stator assembly including an internal layer and an external layer is shown in FIG. 2A. The stator includes winding groups for three phases as shown in FIGS. 2B-D. Examples of hairpin wires having a 5 slot span and a 7 slot span, respectively are shown in FIG. 3A. An example voltage balanced winding scheme for hairpin winding with welding spot and S-shape winding (continuous without welding spot) is shown in FIG. 3B. An example schematic of a 5-7-5-7 slot span winding scheme for a single phase of the electric motor is shown in FIG. 4, while an example schematic of a 5-7-5-7 slot span winding scheme for a three-phase electric motor is given in FIG. 5.

A variety of suitable electric alternating current (AC) motor configurations may be used depending on the end-use design goals. AC motor types include asynchronous (e.g., squirrel cage and wound rotor) and synchronous style motors. Synchronous motors such as multiphase, may be used in certain embodiments. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

Figure 5:
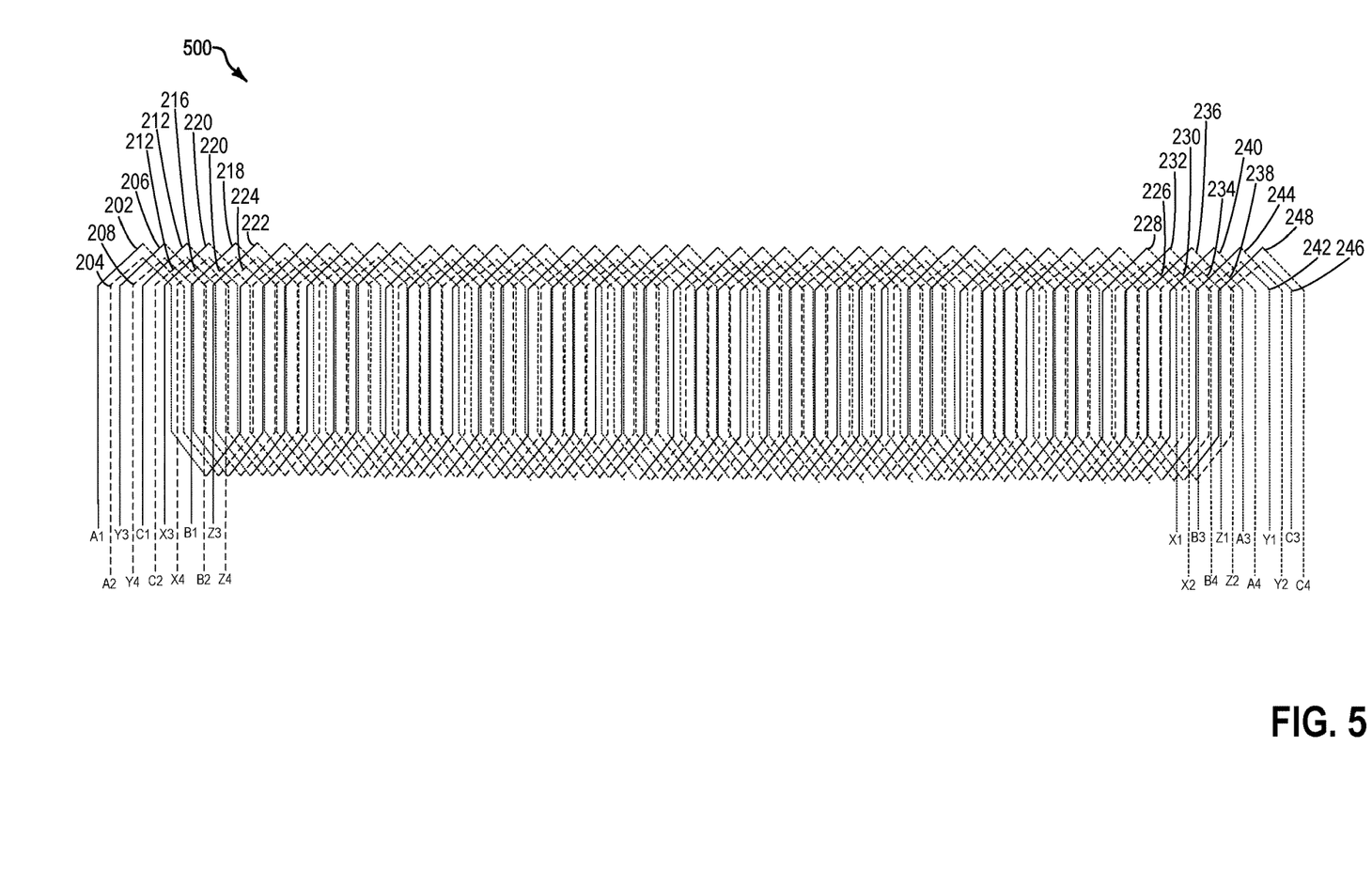
FIG. 5 shows a schematic example of a winding scheme composed entirely of 7 pitch and 5 pitch hairpin wires, for three-phases of a three-phase electric motor.

The electric motor 100 includes a housing 102 that encloses internal components. A stator 104 including a first end winding 106 may be enclosed via the housing 102. The end winding 106 may include a plurality of wound or hairpin wires (e.g., round wires, rectangular wires, flat wires, etc.) which are outside a core of the stator 104. The wound or hairpin wires may be connected to an input voltage source via a three phase bus bar 113, with a coupling to the hairpin wires housed in the end winding 106 indicated by arrow 126. However, it will be appreciated that the stator core also includes wire sections which extend therethrough. Details of the winding scheme for a hairpin winding is shown in FIGS. 4-5. Further, the stator 104 may receive electrical energy from an energy storage device 108 (e.g., battery, capacitor, and the like) and in some cases, such as when the motor is designed with regeneration functionality, transfer electrical energy to the energy storage device 108. Arrow 110 denotes this energy transfer. The electric motor further includes a rotor 112 with a core 114 a rotor shaft 116 rotating about axis 118. It will be understood that a radial direction is any direction perpendicular to the rotational axis 118. Additionally, an axis system 190 including an x-axis, y-axis, and z-axis is also provided, for reference. The z-axis may be a vertical axis, the x-axis may be a lateral axis, and/or the y-axis may be a longitudinal axis, in one example. However, the axes may have other orientations, in other examples. It will be appreciated that the electric motor may be designed to generate rotational output in a first rotational direction and, in certain examples, a second rotational direction. Further, in some examples, the electric motor may be designed to operate in a regeneration mode where the motor receives rotational input and generates electrical energy responsive to receiving the rotational input.

The rotor core 114 may include a plurality of metal laminations 115 (e.g., laminated magnetic steel or iron) or a solid magnetic metal. Thus, the rotor core 114 includes a magnetically interactive portion (e.g., permanent magnet or electromagnet). It will be appreciated that during motor operation the rotor 112 may rotate while the stator 104 is held relatively stationary.

The stator 104 and the rotor 112 are configured to electrically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor 100 is configured to generate rotational output and, in some examples, in a regeneration mode, receive rotational input and generate electrical energy output. Thus, the electric motor 100 may be designed to receive electrical energy from the energy storage device 108 and, in some examples, transfer energy to the energy storage device. Wired and/or wireless energy transfer mechanisms may be used to facilitate this energy transfer functionality.

A first balancing plate 120 is shown attached to the rotor core 114. The balancing plate 120 may be designed to account for imbalances in the rotor 112. To elaborate, the mass and mass distribution of the first balancing plate 120 and a second balancing plate, may be selected to counterbalance residual unbalanced forces in the motor. In other words, the balancing plates may provide cooling airflow dynamics, as well as substantial counterbalance functionality, in one example.

The electric motor 100 may be coupled to a control system 150 with a controller 152. The controller 152 includes a processor 154 (e.g., a microprocessor unit and/or other types of circuits) and memory 156 (e.g., random access memory, read only memory, keep alive memory, combinations thereof, etc.). The controller 152 may be configured to send control commands to system components 158 as well as receive signals from sensors 160 and other suitable components. The controllable components may include the electric motor 100 (e.g., the motor's stator). It will be understood that the controllable components may include actuators to enable the component adjustment. The sensors may include a motor temperature sensor 162, a rotor position sensor 164, etc. As such, the controller 152 may receive a signal indicative of the motor's speed and adjust the output of the motor based on the speed signal. The other controllable components in the electric motor may function in a similar manner. Furthermore, it will be understood that the controller 152 may send and receive signals via wired and/or wireless communication.

FIG. 2A shows a perspective view of a stator 104, as seen from a connection end of the stator 104. Stator 104 includes a cylindrical conductive housing 102 that has 48 radial slots evenly spaced about an inner cylindrical surface. The slots are arranged in a circular fashion around the stator. The slots each extend axially from an insertion side of the stator body to a connection side. The slots each have a rectangular cross-section that is partially closed at the inner cylindrical surface of the stator body. The conductive housing 102 may be set as an electrical ground, as shown in FIG. 2A. Contained within the slots of the housing 102 is a plurality of electric conductors 280. The electric conductors 280 may consist of a plurality of copper wiring bent into a U-shaped coils, referred to herein as hairpin wires. A hairpin wire includes a U-shaped conductive segment that has a two legs joined together at one end (e.g. a turn end) by an end-turn. The other ends (e.g. connection ends) of the legs are spaced apart from each other. During stator assembly, hairpins wires are mounted to the housing 102 by inserting the hairpin legs (while they are still straight) into respective slots from the insertion side of the housing 102. The legs extend through the housing 102 with leg ends extending from the connection side of the housing 102.

As seen in FIG. 2A from the connection end of the stator 104, in a fully assembled stator, each slot contains 8 axially extending hairpin legs. All of the legs in a slot carry the same phase current (phases are not mixed within a slot). The different relative leg positions in the slot correspond to different slot positions or layers (e.g. layers 1 to 8, with layer 8 being the innermost layer). Each of the legs is covered with an insulating resin layer, and each slot is lined with a rectangular, axially extending insulating sleeve (e.g. slot liner). Within each slot, no additional insulating elements are included between the legs.

After the legs of the hairpin wires forming the plurality of electric conductors 280 are inserted into the housing 102 of the stator 104, the legs of the hairpin wires may be bent and subsequently connected. The legs of each hairpin wire forming the plurality of conductors 280 may be bent outward identically for each hairpin wire, such that a bent portion of the leg of a hairpin wire extends over a span of 3 slots beyond the unbent portion of the leg contained within the housing 102. Legs of hairpin wires from adjacent layers may then be connected through welding to form electrical connections, creating 4 sub-layers of connections between the conductors 280. For example, bent leg ends of hairpin wires that extend out of the connection side of the housing 102 in layer 8 may be welded to adjacent bent leg ends extending out of the connection side of the housing 102 in layer 7, and similarly for connections between adjacent legs in layer 6 and layer 5, etc. The connections between adjacent leg ends are made by means of TIG or laser welding that bonds copper to copper and does not require a brazing compound. On the insertion side (not shown) of the stator 104, the end-turns of the hairpins within each lap interleave, such that the 8 layers result in 4 concentric crowns.

As seen in FIG. 2A, some of the hairpin legs (12 in total, 4 per phase) in a first layer (also referred to herein as the external layer), namely those at the beginning and end of each sub-circuit winding, are not joined to an adjacent leg, and extend further from the connection side of the stator to provide terminal connections to a 3 phase bus bar. Similarly, some of the hairpin legs (12 in total, 4 per phase) in an eighth layer (also referred to herein as the internal layer), namely those at the beginning and end of each sub-circuit winding, are not joined to an adjacent leg, and extend further from the connection side of the stator to provide terminal connections to a three phase bus bar (such as three phase bus bar 113 of FIG. 1). The unpaired hairpin legs in the internal and external layers may be connected in parallel for each phase, and the remaining phases may be connected together to the three phase bus bar in a delta or star configuration; the connections to be formed between the unconnected legs is shown schematically in FIGS. 2B-2D for three phases.

FIG. 2B shows schematically parallel connections 254 between 4 sub-circuits making up phase A, which may correspond to connections between pairs of unpaired legs shown in FIG. 2A. Within phase A, leg 202 (A1) in the external layer may be resistively connected to leg 226 (X1) in the internal layer, leg 204 (A2) in the external layer may be resistively connected to leg 228 (X2) in the internal layer, leg 238 (A3) in the internal layer may be resistively connected to leg 214 (X3) in the external layer, and leg 240 (A4) in the internal layer may be resistively connected to leg 216 (X4) in the external layer. The connections between legs 202 and 226, 204 and 228, 238 and 214, and 240 and 216, respectively, may be connected in parallel to a first voltage balanced circuit for phase A at the three phase bus bar. As shown in FIG. 2B, the above connections correspond to parallel connections 254 within phase A between A1 and X1, A2 and X2, X3 and A3, and X4 and A4, respectively.

FIG. 2C shows schematically parallel connections 256 between 4 sub-circuits making up phase B, which may correspond to connections between pairs of unpaired legs shown in FIG. 2A. Within phase B, leg 218 (B1) in the external layer may be resistively connected to leg 242 (Y1) in the internal layer, leg 220 (B2) in the external layer may be resistively connected to leg 244 (Y2) in the internal layer, leg 230 (B3) in the internal layer may be resistively connected to leg 206 (Y3) in the external layer, and leg 232 (B4) in the internal layer may be resistively connected to leg 208 (Y4) in the external layer. The connections between legs 218 and 242, 220 and 244, 230 and 206, and 232 and 208, respectively, may be connected in parallel to a second voltage balanced circuit for phase B at the three phase bus bar. As shown in FIG. 2C, the above connections correspond to parallel connections 256 within phase B between B1 and Y1, B2 and Y2, B3 and Y3, and B4 and Y4, respectively.

Similarly, FIG. 2C shows schematically parallel connections 258 between 4 sub-circuits making up phase C, which may correspond to connections between pairs of unpaired legs shown in FIG. 2A. Within phase C, leg 210 (C1) in the external layer may be resistively connected to leg 234 (Z1) in the internal layer, leg 212 (C2) in the external layer may be resistively connected to leg 236 (Z2) in the internal layer, leg 246 (C3) in the internal layer may be resistively connected to leg 222 (Z3) in the external layer, and leg 248 (C4) in the internal layer may be resistively connected to leg 224 (Z4) in the external layer. The connections between legs 210 and 234, 212 and 236, 246 and 222, and 248 and 224, respectively, may be connected in parallel to a third voltage balanced circuit for phase C at the three phase bus bar. As shown in FIG. 2D, the above connections correspond to parallel connections 258 within phase C between C1 and Z1, C2 and Z2, C3 and Z3, and C4 and Z4, respectively.

Conductive windings for a stator (such as stator 104 of FIGS. 1 and 2A) are provided by hairpin wires. Two differently pitched hairpin wires are shown schematically in FIG. 3A. The hairpin wires 302, 310 are U-shaped segments of conductive wire (such as copper), joined together at one end (e.g. the turn-end) by an end turn 309. The other end (e.g. connection ends) of the legs 306, 308 are spaced apart from each other. Each of the two legs 306, 308 consists of a straight segment 314, a bent segment 316 and a straight leg end 318. During stator assembly, the legs 306, 308 while they are still straight are inserted into a stator housing (such as housing 102 of FIG. 1) into respective slots from the insertion side of the housing. The legs 306, 308 extend through the housing with leg ends 318 extending from the connection side of the stator body. As shown in FIG. 2A, the extending portions of the legs may then be bent outward.

Two different pitch hairpins are used: The end-turns 309 of hairpins 302, 310 have different spans such that hairpin 302 has leg spacing or pitch of 7 slots, and hairpin 310 has a pitch of 5 slots. The connection-side legs 306, 308 of both hairpins 302, 310 each include a bent segment 316 which is bent with the same span—a span of 3 slots, outward from the end turn 309. Wave windings may be formed by serially connecting alternating hairpins 302 and 310 together at their respective connecting ends (e.g. leg end 308 of hairpin 302 may be connected to leg end 306 of hairpin 310).

FIG. 3B shows an example of a four voltage-balanced winding scheme 350 of hairpin wires for a single phase of a three-phase motor, consisting of four sub-circuits 362, 364, 366, and 368. Each of the four sub-circuits is depicted in FIG. 3B as partially consisting of solid lines and partially consisting of dashed lines as a visual aid. The winding scheme 350 is configured to be placed in a stator with 24 slots (truncated from a full winding scheme of 48 slots), thus having 2 slots per pole per phase. As shown in FIG. 3B, the numbering of the slots goes from left to right starting at 1, and the periodicity of the slot configuration is denoted by the dotted lines 370, which indicates the position of slot 1.

Each sub-circuit of the winding scheme 350 may be configured by joining two hairpin wires of 7 slot span and 5 slot span. Both the 7 slot span hairpin and the 5 slot span hairpin within a given circuit have legs bent outwards from their respective end turns with a slot span of 3, and the 7 slot span and 5 slot span hairpin wires may be joined at leg ends, hence, for a stator with 24 slots, a sub-circuit may make a full rotation around the stator, with the unconnected leg ends of the 7 slot span hairpin and the 5 slot span hairpin contained within the same slot number. For example, within sub-circuit 362, the first 7 slot span hairpin has the unbent portion of its left, first leg starting in slot 1, and connects to a first 5 slot span hairpin in slot 11, where the right, second leg end of the first 7 slot span hairpin wire and the left, first leg end of the first 5 slot span hairpin wire are connected. As the first 7 slot hairpin spans over 7 slots and then has a 3 slot span leg bending, the right, second leg of the first 7 slot hairpin is in the position of the slot number 11. The left, first leg of the first 5 slot span hairpin wire is also in the position of the slot number 11. The right, second leg end of the first 5 slot hairpin of sub-circuit 362 may end in slot 22. This configuration of sub-circuit 362 may be herein referred to as a 7-5 configuration, starting from slot 1. This 7-5 configuration accounts for the voltage balance in the sub-circuits as for example in the sub-circuit 362, the voltage at slot 1 is equal to the voltage at slot 13 and in the sub-circuit 364, the voltage at slot 2 is equal to the voltage at slot 14.

Sub-circuits 362 and 364 as depicted in FIG. 3B are interleaved. The sub-circuit 362 has a 7-5 configuration starting from slot 1, while the sub-circuit 364 has a 5-7 hairpin wire configuration starting from slot 2. Similarly, the sub-circuits 366, 368 are interleaved, with sub-circuit 366 having a 7-5 configuration starting from slot 7 while sub-circuit 368 has a 5-7 configuration starting from slot 8.

The sub-circuits 362, 364, 366, 368 are shown schematically in FIG. 3B as being left unconnected. In order to complete the electrical circuits, sub-circuits 362, 364, 366, and 368 may each be connected by connecting the unpaired legs within each sub-circuit in parallel to an input voltage source. The connections within sub-circuits 362, 364 as shown is such that the voltage drop within each of sub-circuits 362, 364 goes from left to right, while the connections within sub-circuits 366, 368 as shown is such that the voltage drop within each of sub-circuits 366, 368 goes from right to left. The winding scheme 350 may then generate two pairs of magnetic poles through the application of an input voltage as described above, consisting of a first pair of north and south poles 352 and 354, respectively, and a second pair of north and south poles 356 and 358, respectively. As an AC input voltage is applied, the directionality of the pairs of magnetic poles will swap from north and south to south and north with a period of the oscillation of the input voltage.

FIG. 4 shows schematically an example winding diagram 400 of a winding of a plurality of conductors into eight layers within a stator corresponding to the winding of the plurality of conductors 280 within the stator 140 FIG. 2A. The winding diagram 400 shows the winding within a single phase of a three-phase motor, with sub-circuits 402, 404, 406 and 408 corresponding to sub-circuits of phase A, as described in FIG. 2B. The sub-circuits 402, 404, 406 and 408 may be connected in parallel as shown in 254 of FIG. 2B.

Winding diagram 400 shows how each sub-circuit winding turns the stator 4 times. On the insertion side, there may be an alternating pattern of 7 pitch and 5 pitch hairpin wires, whose end turns are schematically indicated by 420 and 422 and repeated throughout the diagram 400, and on the connection side. There may be a pattern of 6 pitch connections between adjacent legs of 7 pitch and 5 pitch hairpin wires, schematically indicated by 424 and repeated throughout the diagram. Each lap may occur over two layers—for example, a first turn for phase A1 winding sub-circuit 402 may comprise: a 7 pitch hairpin having a first leg in slot 1, layer 1 and a second leg in slot 8, layer 2, with the second leg end connected to an adjacent first leg end of a 5 pitch hairpin that is located in slot 14, layer 1, with the forward direction pattern continuing in layers 1 and 2 until the first turn is completed with a hairpin leg in slot 43, layer 2, which is then joined to the end of a hairpin leg from slot 1, layer 3, and the next lap, (which occurs in layers 3 and 4) begins. This pattern may leave two legs within the sub-circuit 402 unconnected, a first leg of a 7 pitch hairpin in slot 1, layer 1, and a second leg of a 5 pitch hairpin in slot 43, layer 8. On the connection side, the first leg of the 7 pitch hairpin may be bent into a position of slot 46, layer 1, while the second leg of the 5 pitch hairpin may be bent into a position of slot 46, layer 8. These unconnected legs may be connected in the manner shown in 254 of FIG. 2B.

Due to the "two-layer" per turn configuration, on the connection side, pairs of adjacent leg ends from the first layer the second layer are connected together; pairs of adjacent leg ends from the third layer and the fourth layer are connected together and so on. Cross-over connections between the second and third layers may be made by aligning bent leg from layer 2 with a bent leg with layer 3 and welding the two leg ends together. Similar connections are made to interconnect other layers. As an example, within sub-circuit 404, the same pattern of sub-circuit 402 may be repeated, but offset by one slot in the clockwise direction.

Sub-circuits 402 and 404 are wound in a forward-winding configuration 412, while sub-circuits 406 and 408 may be wound in a backward-winding configuration 414; for example, as shown in FIG. 4, the forward-winding configuration 412 may correspond to winding in a clockwise direction as viewed from an insertion side of the stator, while the backward-winding configuration 414 may correspond to winding in a counter-clockwise direction as viewed from the insertion side of the stator. For example, a first turn for phase A3 winding sub-circuit 408 may comprise: a 5 pitch hairpin having a first leg in slot 1, layer 8 and a second leg in slot 44, layer 7, with the second leg end connected to an adjacent first leg end of a 5 pitch hairpin that is located in slot 38, layer 8, with the backward direction patter continuing in layers 7 and 8 until the first turn in completed with a hairpin leg in slot 7, layer 7, which is then joined to the end of a hairpin leg from slot 1, layer 6, and the next lap, (which occurs in layers 5 and 6) begins. This pattern may leave two legs within the sub-circuit 406 unconnected, a first leg of a 7 pitch hairpin in slot 1, layer 8, and a second leg of a 5 pitch hairpin in slot 7, layer 1. On the connection side, the first leg of the 7 pitch hairpin may be bent into a position of slot 4, layer 1, while the second leg of the 5 pitch hairpin may be bent into a position of slot 4, layer 8. These unconnected legs may be connected in the manner shown in 254 of FIG. 2B. Similarly, sub-circuit 408 may have the same winding pattern as sub-circuit 406, but offset by one slot in the counterclockwise direction.

The forward winding configurations 412 and the backward winding configurations 414 may be interleaved to generate 4 pairs of oppositely oriented magnetic poles evenly interspersed around the stator and within each layer. For example, as shown in layer 8, there are 4 pairs of oppositely oriented magnetic poles generated by the forward winding 412 and backward winding 414 sub-circuits 404 and 408, indicated by pairs 432 and 433, 434 and 435, 436 and 437, and 438 and 439, respectively. The pairs 432 and 433 correspond to a 5 pitch hairpin 422 and a 7 pitch hairpin 420, respectively, and similarly for pairs 434 and 435, 436 and 437, and 438 and 439. Similarly aligned pair poles are generated within each layer, with an alternating pattern between adjacent layers, i.e. the pole pairs go from a 5 pitch and 7 pitch configuration in one layer to a 7 pitch and 5 pitch configuration in an adjacent layer.

FIG. 5 shows a configuration of the winding pattern 500 of a plurality of conductors into eight layers within a stator corresponding to the winding of the plurality of conductors 280 of within the stator 140 FIG. 2A. The winding pattern 500 is a linear depiction of the circular pattern as depicted in FIG. 2A. The winding diagram 500 corresponds to three phases of a three-phase motor, with 12 sub-circuits corresponding to the sub-circuits of phase A, B, and C, as described in 254 of FIG. 2B, 256 of FIG. 2C, and 258 of FIG. 2D, respectively. Each phase winding group is wave wound and includes 2 parallel sub-circuit windings (e.g. A1, A2) in parallel connection. Each sub-circuit winding turns the stator 8 times (4 forward winding turns connected in series, four backward winding turns connected in series).

In phase A, leg 202 (A1) of a first 7 slot span hairpin in an external layer is connected to leg 226 (X1) of an eighth 5 slot span hairpin of an internal layer with alternating seven 7 slot span hairpins and seven 5 slot span hairpins in between. Similarly, leg 214 (X3) of a 5 slot span hair pin in the internal layer may be connected to leg 238 (A2) of a 7 slot span hairpin of the external layer with a series of alternating 5 slot span hairpins and 7 slot span hairpins in between. A sub-circuit starting at A1 is wound in a forward-winding configuration (such as clockwise direction as viewed from the insertion side of the stator), while another sub-circuit starting at X3 may be wound in a backward-winding configuration (such as a counter-clockwise direction as viewed from the insertion side of the stator).

In this way, by using alternate hairpins of 7 slot span and 5 slot span for winding a three-phase electric motor, the process of winding may be simplified and manufacturing costs may be reduced. By using identical leg bending (3 slot spans) for both types of hairpins, legs of adjacent 7 slot span hairpin and 5 slot span hairpin within a slot may be connected through welding to form electrical connections which may further simplify manufacturing. The technical effect of including four balanced sub-groups of winding is that flexibility in phase connections may be increased to accommodate a variety of high frequency applications. By using the proposed hairpin winding on an electric motor, losses from the skin effect may be reduced, and efficiency of the motor may be improved.

An example system for a stator assembly of an electric motor comprises: a plurality of radial slots positioned around an inner cylindrical surface, and a winding scheme for the stator assembly including alternating positioning of a hairpin wire having a seven slot span and another hairpin wire having a five slot span in four sub-circuits. In the preceding example, additionally or optionally, the hairpin wire having the seven slot span includes a U-shaped conductive segment with first ends of two legs joined together at an end-turn and the second ends of the two legs spaced apart from each other by the seven slot span, and wherein the hairpin wire having the five slot span includes another U-shaped conductive segment with first ends of two legs joined together at another end-turn and the second ends of the two legs spaced apart from each other by the five slot span. In any or all of the preceding examples, additionally or optionally, for each of the hairpin wire having the seven slot span and the other hairpin wire having the five slot span, each leg is bent outwards over a three slot span. In any or all of the preceding examples, additionally or optionally, the stator assembly includes a connection side and an insertion side, and each of the hairpin wire having the seven slot span and the hairpin wire having the five slot span is inserted into respective slots from the insertion side with each leg of the hairpin wire having the seven slot span and the hairpin wire having the five slot span extending axially though a housing of the stator assembly and extending out from the connection side. In any or all of the preceding examples, additionally or optionally, each slot of the plurality of radial slots include eight layers including a first, internal layer and an eighth, external layer with each layer formed to accommodate one leg of one of a hairpin wire having the seven slot span and another hairpin wire having the five slot span. Any or all of the preceding examples, further comprising, additionally or optionally, a first leg of a hairpin wire having the seven slot span and a first leg of a hairpin wire having the five slot span from two adjacent layers are connected via welding. In any or all of the preceding examples, additionally or optionally, the four sub-circuit are wired into three phases with an output voltage for each phase being equal, and wherein each of a plurality of hairpin legs included within each slot carries current of a same phase. In any or all of the preceding examples, additionally or optionally, for each sub-circuit, each hairpin leg in the first, internal layer of each slot and each hairpin leg in the eighth, external layer of each slot is not connected to a respective adjacent hairpin leg and provide terminal connections for one phase. Any or all of the preceding examples, further comprising, additionally or optionally, in a first sub-circuit, a first hairpin leg in the first, internal layer is coupled to a second hairpin leg in the second, external layer to form a first connection, in a second sub-circuit, a third hairpin leg in the first, internal layer is coupled to a fourth hairpin leg in the second, external layer to form a second connection, in a third sub-circuit, a fifth hairpin leg in the first, internal layer is coupled to a sixth hairpin leg in the second, external layer to form a third connection, and in a fourth sub-circuit, a seventh hairpin leg in the first, internal layer is coupled to an eighth hairpin leg in the second, external layer to form a fourth connection, wherein each of the first connection, the second connection, the third connection, and the fourth connection are connected in parallel to a voltage balanced phase circuit. In any or all of the preceding examples, additionally or optionally, each of the first sub-circuit and the second sub-circuit is in a forward, clock-wise winding configuration, and wherein each of the third sub-circuit and the fourth sub-circuit is in reverse, counter-clockwise winding configuration. In any or all of the preceding examples, additionally or optionally, a winding for each of the first sub-circuit, the second sub-circuit, the third sub-circuit and the fourth sub-circuit turns the stator assembly four times covering two layers per turn. In any or all of the preceding examples, additionally or optionally, for each of the first sub-circuit, the second sub-circuit, the third sub-circuit and the fourth sub-circuit, a voltage drop is balanced over every twenty four slots with the voltage drop at a first slot being equal to a voltage drop at a thirteenth slot.

Another example system for conductive windings for a stator of an electric motor, comprises: three winding groups corresponding to three separate phases, respectively, with each group including a first pitch hairpin and a second pitch hairpin alternating over four sub-circuits, the first pitch hairpin and the second pitch hairpin including identical leg bending. In the preceding example, additionally or optionally, the first pitch hairpin spans over seven slots and the second pitch hairpin spans over five slots, and wherein the identical leg bending is over three slots for each leg. In any or all of the preceding examples, additionally or optionally, for a first of the four sub-circuits, a first pitch hairpin has an unbent portion of its left, first leg starting in first slot, and connects to a second pitch hairpin in an eleventh slot, and wherein a right, second leg end of the first hairpin and a left, first leg of the second pitch hairpin wire are connected at the eleventh slot. In any or all of the preceding examples, additionally or optionally, the first sub-circuit and a second sub-circuit of the four sub-circuits are interleaved with the first sub-circuit having a forward winding configuration of alternating the first pitch hairpin and the second pitch hairpin with the first pitch hairpin starting in the first slot, and the second sub-circuit having the forward winding configuration of alternating the second pitch hairpin and the first pitch hairpin with the second pitch hairpin starting in a second slot. In any or all of the preceding examples, additionally or optionally, a third sub-circuit and a fourth sub-circuit of the four sub-circuits are interleaved with the third sub-circuit having a reverse winding configuration of alternating the first pitch hairpin and the second pitch hairpin with the first pitch hairpin starting in the seventh slot, and the fourth sub-circuit having the reverse winding configuration of alternating the second pitch hairpin and the first pitch hairpin with the second pitch hairpin starting in an eighth slot.

Another example system for a stator in an electric motor, comprises: a plurality of radial slots evenly spaced circumferentially around an inner cylindrical surface with each slot sized to accommodate eight layers of conductors and extending axially from an insertion side of the stator to a connection side, and conductive winding including a plurality of hairpin wires of alternating seven slot span and five slot span forming four parallel sub-circuits with legs of each adjacent seven slot span hairpin and five slot span hairpin connected through welding. In the preceding example, additionally or optionally, each leg of a seven slot span hairpin and a five slot span hairpin is bent outwards over a three slot span. In any or all of the preceding examples, additionally or optionally, for a first sub-circuit and a second sub-circuit, the winding is clockwise with a first voltage across each of the first sub-circuit and the second sub-circuit in a first direction, and wherein for a third sub-circuit and a fourth sub-circuit the winding is counter clockwise with a second voltage across each of the third sub-circuit and the fourth sub-circuit in a second, opposite direction, the first voltage and the second voltage identically generated by a combined first pair and second pair magnetic poles upon spinning of a rotor of the electric motor.

FIG. 2A shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

It will be appreciated that the configurations herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a stator assembly of an electric motor, comprising:
  a plurality of radial slots positioned around an inner cylindrical surface; and
  a winding scheme for the stator assembly including alternating positioning of a hairpin wire having a seven slot span and a hairpin wire having a five slot span in four sub-circuits,
  wherein each slot of the plurality of radial slots include eight layers including a first, internal layer and an eighth, external layer with each layer formed to accommodate one leg of one of the hairpin wire having the seven slot span and the hairpin wire having the five slot span,
  wherein the four sub-circuit are wired into three phases with an output voltage for each phase being equal, wherein the four sub-circuits are wired into three phases with an output voltage for each phase being equal, wherein each of a plurality of hairpin legs included within each slot carries current of a same phase, wherein for each sub-circuit, some hairpin legs in the first, internal layer and the eighth, external layer are not connected to a respective adjacent hairpin leg so as to provide terminal connections for one phase, and wherein, in a first sub-circuit, a first hairpin leg in the first, internal layer is coupled to a second hairpin leg in a second, external layer to form a first connection, in a second sub-circuit, a third hairpin leg in the first, internal layer is coupled to a fourth hairpin leg in the second, external layer to form a second connection, in a third sub-circuit, a fifth hairpin leg in the first internal layer is coupled to a sixth hairpin leg in the second d, external layer to form a third connection, and in a fourth sub-circuit, a seventh hairpin leg in the first, internal layer is coupled to an eighth hairpin leg in the second, external layer to form a fourth connection, wherein each of the first connection, the second connection, the third connection, and the fourth connection are connected in parallel to a voltage balanced phase circuit.

2. The system of claim 1, wherein the hairpin wire having the seven slot span includes a U-shaped conductive segment with first ends of two legs joined together at an end-turn and second ends of the two legs spaced apart from each other by the seven slot span, and wherein the hairpin wire having the five slot span includes another U-shaped conductive segment with first ends of two legs joined together at another end-turn and the second ends of the two legs spaced apart from each other by the five slot span.

3. The system of claim 1, wherein for each of the hairpin wire having the seven slot span and the hairpin wire having the five slot span, each leg is bent outwards over a three slot span.

4. The system of claim 3, further comprising a first leg of the hairpin wire having the seven slot span and the first leg of a hairpin wire having the five slot span from two adjacent layers are connected via welding.

5. The system of claim 1, wherein the stator assembly includes a connection side and an insertion side, and each of the hairpin wire having the seven slot span and the hairpin wire having the five slot span is inserted into respective slots from the insertion side with each leg of the hairpin wire having the seven slot span and the hairpin wire having the five slot span extending axially through a housing of the stator assembly and extending out from the connection side.

6. The system of claim 1, wherein each of the first sub-circuit and the second sub-circuit is in a forward, clock-wise winding configuration, and wherein each of the third sub-circuit and the fourth sub-circuit is in reverse, counter-clockwise winding configuration.

7. The system of claim 1, wherein a winding for each of the first sub-circuit, the second sub-circuit, the third sub-circuit and the fourth sub-circuit turns the stator assembly four times covering two layers per turn.

8. The system of claim 1, wherein for each of the first sub-circuit, the second sub-circuit, the third sub-circuit and the fourth sub-circuit, a voltage drop is balanced over every twenty-four slots with the voltage drop at a first slot being equal to a voltage drop at a thirteenth slot.

9. A system for conductive windings for a stator of an electric motor, comprising:
three winding groups corresponding to three separate phases, respectively, with each group including a first pitch hairpin and a second pitch hairpin alternating over four sub-circuits, the first pitch hairpin and the second pitch hairpin including identical leg bending and spanning over a different number of slots from one another, wherein each of the winding groups uses only two different configurations of hairpins, the two configurations comprising the first pitch hairpin and the second pitch hairpin, with adjacent ones of the first pitch hairpins and the second pitch hairpins connected to one another to form each of the four sub-circuits, wherein the four sub-circuits are wired into three phases with an output voltage for each phase being equal, and wherein, in a first sub-circuit, a first hairpin leg in a first, internal layer is coupled to a second hairpin leg in a second, external layer to form a first connection, in a second sub-circuit, a third hairpin leg in the first, internal layer is coupled to a fourth hairpin leg in the second, external layer to form a second connection, in a third sub-circuit, a fifth hairpin leg in the first, internal layer is coupled to a sixth hairpin leg in the second, external layer to form a third connection, and in a fourth sub-circuit, a seventh hairpin leg in the first, internal layer is coupled to an eighth hairpin leg in the second, external layer to form a fourth connection, wherein each of the first connection, the second connection, the third connection, and the fourth connection are connected in parallel to a voltage balanced phase circuit.

10. The system of claim 9, wherein the first pitch hairpin spans over seven slots and the second pitch hairpin spans over five slots, and wherein the identical leg bending is over three slots for each leg.

11. The system of claim 9, wherein for a first of the four sub-circuits, a first pitch hairpin has an unbent portion of its left, first leg starting in first slot, and connects to a second pitch hairpin in an eleventh slot, and wherein a right, second leg end of the first hairpin and a left, first leg of the second pitch hairpin wire are connected at the eleventh slot.

12. The system of claim 11, wherein the first sub-circuit and a second sub-circuit of the four sub-circuits are interleaved with the first sub-circuit having a forward winding configuration of alternating the first pitch hairpin and the second pitch hairpin with the first pitch hairpin starting in the first slot, and the second sub-circuit having the forward winding configuration of alternating the second pitch hairpin and the first pitch hairpin with the second pitch hairpin starting in a second slot.

13. The system of claim 11, wherein a third sub-circuit and a fourth sub-circuit of the four sub-circuits are interleaved with the third sub-circuit having a reverse winding configuration of alternating the first pitch hairpin and the second pitch hairpin with the first pitch hairpin starting in the seventh slot, and the fourth sub-circuit having the reverse winding configuration of alternating the second pitch hairpin and the first pitch hairpin with the second pitch hairpin starting in an eighth slot.

14. A system for a stator in an electric motor, comprising:
a plurality of radial slots evenly spaced circumferentially around an inner cylindrical surface with each slot sized to accommodate eight layers of conductors and extending axially from an insertion side of the stator to a connection side; and conductive winding including a plurality of hairpin wires of alternating seven slot span and five slot span forming four parallel sub-circuits with legs of each adjacent seven slot span hairpin and five slot span hairpin connected through welding, wherein the conductive winding comprises three winding groups corresponding to three separate phases, respectively, with each group including seven slot span hairpins and a five hairpins alternating over the four sub-circuits, wherein each group uses only two different configurations of hairpins, the two configurations comprising the seven slot span hairpin and the five slot span hairpin, with adjacent ones of the seven slot span hairpins and the five slot span hairpins connected to one another to form each of the four sub-circuits, wherein the four sub-circuits are wired into three phases with an output voltage for each phase being equal, and wherein, in a first sub-circuit, a first hairpin leg in a first, internal layer is coupled to a second hairpin leg in a second, external layer to form a first connection, in a second sub-circuit, a third hairpin leg in the first, internal layer is coupled to a fourth hairpin leg in the second, external layer to form a second connection, in a third sub-circuit, a fifth hairpin leg in the first, internal layer is coupled to a sixth hairpin leg in the second, external layer to form a third connection, and in a fourth sub-circuit, a seventh hairpin leg in the first, internal layer is coupled to an eighth hairpin leg in the second, external layer to form a fourth connection, wherein each of the first connection, the second connection, the third connection, and the fourth connection are connected in parallel to a voltage balanced phase circuit.

15. The system of claim 14, wherein each leg of a seven slot span hairpin and a five slot span hairpin is bent outwards over a three slot span.

16. The system of claim 14, wherein for the first sub-circuit and the second sub-circuit, the winding is clockwise with a first voltage across each of the first sub-circuit and the second sub-circuit in a first direction, and wherein for the third sub-circuit and the fourth sub-circuit the winding is counter clockwise with a second voltage across each of the third sub-circuit and the fourth sub-circuit in a second, opposite direction, the first voltage and the second voltage identically generated by a combined first pair and second pair magnetic poles upon spinning of a rotor of the electric motor.

* * * * *